US011529036B2

(12) United States Patent
Bofill et al.

(10) Patent No.: US 11,529,036 B2
(45) Date of Patent: Dec. 20, 2022

(54) ROBOTIC CLEANING APPARATUS AND SYSTEM

(71) Applicants: Steven J. Bofill, New Rochelle, NY (US); Mark Strauss, Old Greenwich, CT (US)

(72) Inventors: Steven J. Bofill, New Rochelle, NY (US); Mark Strauss, Old Greenwich, CT (US)

(73) Assignee: Bofill Strauss LLC, Old Greenwich, CT (US)

( * ) Notice: Subject to any disclaimer, the term of this patent is extended or adjusted under 35 U.S.C. 154(b) by 497 days.

(21) Appl. No.: 16/390,550

(22) Filed: Apr. 22, 2019

(65) Prior Publication Data
US 2019/0320859 A1    Oct. 24, 2019

Related U.S. Application Data

(60) Provisional application No. 62/660,604, filed on Apr. 20, 2018.

(51) Int. Cl.
*A47L 11/38*      (2006.01)
*B08B 3/02*      (2006.01)
(Continued)

(52) U.S. Cl.
CPC .............. *A47L 11/38* (2013.01); *B08B 3/024* (2013.01); *E04G 23/002* (2013.01); *A47L 1/02* (2013.01);
(Continued)

(58) Field of Classification Search
CPC ... B08B 3/024; E04G 23/002; A47L 2201/00; A47L 11/38; G05D 1/0094; G05D 2201/0203; B64C 39/024; B64C 17/02
See application file for complete search history.

(56) References Cited

U.S. PATENT DOCUMENTS 3,080,592 A    3/1963   Hassage
3,298,052 A    1/1967   Wolfe
(Continued)

FOREIGN PATENT DOCUMENTS

CN    202375015 U    8/2012
CN    206934059 U    1/2018
(Continued)

OTHER PUBLICATIONS

"Aerones"—Retrieved from the Internet: https://www.aerones.com/eng/cleaning_drone/ (retrieved Apr. 22, 2019.).
(Continued)

*Primary Examiner* — Joseph L. Perrin
*Assistant Examiner* — Kevin G Lee
(74) *Attorney, Agent, or Firm* — Whitmyer IP Group LLC

(57) ABSTRACT

A robotic device for working on a surface includes a body including: a tool for working on the surface; a controller moving the body along the surface; a first set of at least two rotors mounted to the body and generating thrust in a first direction towards the surface; and a second set of at least two rotors mounted to the body and generating thrust in a second direction away from the surface. A sensor measures a distance between the body and the surface, and a computer adjusts the first set of rotors and the second set of rotors in response to the sensor to place the body in position to work on the surface. In particular, the first set of rotors and the second set of rotors generate a net force on the body to it in non-contact position to work on the surface.

19 Claims, 12 Drawing Sheets

(51) Int. Cl.
*E04G 23/00* (2006.01)
*A47L 1/02* (2006.01)
*B08B 5/02* (2006.01)
*B64C 17/02* (2006.01)

(52) U.S. Cl.
CPC ............ *A47L 2201/00* (2013.01); *B08B 5/02* (2013.01); *B08B 2203/02* (2013.01); *B08B 2205/00* (2013.01); *B64C 17/02* (2013.01)

(56) References Cited

U.S. PATENT DOCUMENTS

| | | | |
|---|---|---|---|
| 9,439,545 B2 | 9/2016 | Baek et al. | |
| 9,764,839 B2 * | 9/2017 | Whitaker | B64C 27/00 |
| 10,577,098 B2 * | 3/2020 | Chang | B64C 37/02 |
| 2015/0274294 A1 * | 10/2015 | Dahlstrom | B05B 13/0278 239/722 |
| 2018/0208307 A1 * | 7/2018 | Boehme | A47L 11/36 |
| 2019/0084679 A1 * | 3/2019 | Falder | B08B 3/024 |
| 2019/0168875 A1 | 6/2019 | Ashur et al. | |
| 2019/0359329 A1 * | 11/2019 | Gavrilov | B08B 3/024 |
| 2020/0216173 A1 * | 7/2020 | Suefuku | B08B 1/04 |

FOREIGN PATENT DOCUMENTS

| | | |
|---|---|---|
| JP | 6558508 B1 * | 8/2019 |
| WO | 2018091943 A1 | 5/2018 |
| WO | 2019040975 A1 | 3/2019 |

OTHER PUBLICATIONS

YouTube. "Company Eyes Large Market with Window Cleaning Robot for High Rise Buildings".—Retrieved from the Internet: https://www.youtube.com/watch?v=4bV4azh5sO0&feature=youtu.be (retrieved Apr. 22, 2019.).

"Leatu Robot", Retrieved from the Internet: http://www.leatu.net/?lg=en (retrieved Apr. 22, 2019.).

Youtube. Robot Enthusiast: "A Giant Window Cleaning Robot".—Retrieved from the Internet: https://www.youtube.com/watch?v=v72xSAlg_mM (retrieved Apr. 22, 2019.).

Perkins, Sid. Science News for Students: "This robot can wash a skyscraper's window".—Retrieved from the Internet: https://www.sciencenewsforstudents.org/blog/eureka-lab/robot-can-wash-skyscrapers-windows (retrieved Apr. 22, 2019.).

* cited by examiner

ROBOTIC CLEANING APPARATUS AND SYSTEM

CROSS-REFERENCE TO RELATED APPLICATIONS

This application claims priority to U.S. Provisional Application No. 62/660,604 filed on Apr. 20, 2019.

TECHNICAL FIELD

The present invention relates to utility robots and robotic systems for performing inspection and/or maintenance work on exterior surfaces of a structure, for example the walls or windows of a building. Such maintenance work includes but is not limited to cleaning the exterior surfaces, coating substances on the exterior surfaces, preparing the exterior surfaces for future work, or installing peripheral objects on to the exterior surfaces. More specifically, the present invention relates to a compact robot for washing windows of a building.

BACKGROUND

Conventional methods of exterior inspection or window washing of multi-story buildings, such as skyscrapers, are fairly complex, involving a crew of workers riding a scaffold that is suspended by cords from rails or tracks located at the top of the roof. A variety of mechanisms, such as a boom arms, powered davit carriage units, and portable davit masts, are used for attaching the platform to the building and moving the scaffold up and down at the command of an technician.

However, window washing on high-rise buildings remains a dangerous task. The technician must support himself on the scaffold while washing the windows. In addition, the technician wears a safety harness secured to the scaffold or rigging at the top for safety purposes. This extra equipment can hinder the worker's freedom of movement, thereby restricting his/her ability to freely manipulate cleaning tools. A considerable amount of time and effort is devoted by the technician just on maintaining stable support on the scaffold. As a result, cleaning windows by a manual method is slow and inefficient. Conventional methods of window washing are also made more dangerous by the presence of wind or gusts. It is well known that there are stronger winds at higher elevations, which means that window washing becomes increasingly dangerous the higher up the technician is. In cities, a canyon effect can also occur between multiple high-rise buildings, where the buildings redirect wind down their facades and funnel it along streets at higher velocities. The canyon effect similarly makes conventional window washing dangerous.

Attempts have been made to address the issues related to window washing at high elevations using robots, but fail to do so and/or bring about other drawbacks. Known window washing robots require contact with the actual window being washed or the walls of the building. For example, U.S. Pat. No. 3,298,052 teaches a window washing apparatus that has self-contained means for washing an entire column of windows located between two vertical pillars or structural columns. The apparatus includes a washer roller with bristles for scrubbing the windows and a water tank immediately below the washer roller so that the roller has physical contact at all times with water. The apparatus also has a dryer roller for rubbing off excess water as well as a squeegee for wiping the window surface clean. In order to maintain the apparatus at a fixed distance away from the windows, the apparatus has shoes on opposing ends of the frame which are inserted into and travel within vertical grooves formed in the pillars (i.e., vertical columns) of the building. This apparatus is disadvantageous because it can only be used on buildings that have been constructed with vertical grooves designed to receive the shoes of the apparatus. In addition, the bristles require replacement after they become dull and can potentially scratch or damage the windows. The dryer roller and squeegee, which are constantly in contact with the window through cleaning operations can also leave streaks. The presence of a water tank can also cause issues since it increases the weight and size of the apparatus. Finally, the water within the tank is reused and will gradually become dirty as washing operations are performed on subsequent windows, thereby rendering the apparatus ineffective in cleaning windows.

Other known cleaning robots require legs, wheels, or tracks that are supported by and travel on top of the windows. Some robots require bumpers to dampen the impact the robot has with the window surface. For example, CN 206934059 teaches a cleaning machine that is adapted to avoid obstacles present on high-rise building facades. This large machine has a cleaning body connected to a suspension cable, a rotor assembly, three cleaning units, and a plurality of telescopic rods connected between the cleaning units and the rotor assembly. The cleaning units consist of a rag, a roller brush, and a scraper. A detecting unit is configured to detect obstacles (e.g., mullions, sashes) on the window or wall of the building. When each cleaning unit encounters an obstacle, a corresponding telescopic rod controls the respective cleaning unit to expand or contract. The machine must employ a complex sequence of actions in order to compensate for the machine's center of gravity being offset. Specifically, as the telescopic rod of the first cleaning unit contracts and expands, the cleaning body slides between the rotor assembly and the three cleaning units to adjust the position of the center of gravity, thereby preventing the cleaning machine from turning over. This sequence of steps must be repeated when the second and third cleaning units encounter the same obstacle. During operation, the rotor assembly must generate sufficient thrust towards the building so that the cleaning units remains in close contact with the windows. The machine of CN 206934059 has several drawbacks, including the necessity for intricate movements to maintain equilibrium. The constant thrust of the robot against the window may also apply undue stress against the window, which can potentially damage the window or its mounting to the building. The machine similarly requires an on-board water tank.

PCT/AU2018/050896 is directed to a mechanical device comprising a vehicle tethered to a positioning system secured to the building. The vehicle includes rotating cleaning disks with pads to scrub the windows, misting nozzles, and at least one wiper blade to wipe the window. To assist in controlling the placement of the vehicle on the window, a set of contact wheels are mounted on inwardly extending arms. When the vehicle needs to traverse a mullion, the vehicle ceases cleaning operations and uses propellers to push the vehicle off and away from the building. Once the mullion is cleared, the propellers are turned off, thereby allowing the vehicle to free fall back towards the building, re-contact a window surface, and start cleaning operations. The vehicle may include another set of propellers to generate thrust towards the building in order to re-establish contact with the window. However, the vehicle requires contact with the window to perform cleaning operations.

The force (e.g., torque) created by the rotating cleaning disks may cause the vehicle to bounce off the window against the force applied by thrust-on propellers. This can make cleaning operations ineffective. In addition, if a solid object is caught underneath the cleaning pads while being rotated, the solid object could scratch the windows and diminish the aesthetic look of the window.

Aerones, Sia provides a large 100+ pound drone which uses a traditional arrangement of horizontal rotors and propeller blades to generate lift. The rotors also generate propulsion towards the building so that contact with the building can be achieved. The drone has sponge rollers that serve as safety buffers to cushion the impact the drone has with the window as it pressure washes the windows. Water is provided from the ground through a hose that extends up to the drone. A cable transmitting electricity to the drone is also fed from the ground up to the drone. Aerones teaches a similar drone for firefighting purposes in PCT/IB2016/056866. However, Aerones's window-washing drone necessitates contact with the building. In addition, the drone does not provide a mechanism to adequately address issues related to the pressure wash forcing the drone backwards away from the building. Another drawback with the drone relates to its significant size and weight, which requires that it have at least 12 motors to generate enough lift. Further, the drone must generate enough lift to counter the weight of the water hose and electric cable. This becomes increasingly difficult for taller buildings. The ground connection of the water hose and electric cable also means that the drone can only wash buildings up to a certain height before the hose and cable become unfeasibly long. Moreover, Aerones' system requires a high-pressure pump in order to adequately force water up to the drone against gravity.

Thus, there exists a need in the art for a utility robot which has the capacity to inspect and/or conduct maintenance work (e.g., widow washing) on exterior surfaces of a structure while addressing the above problems.

SUMMARY

The needs set forth herein as well as further and other needs and advantages are addressed by the present embodiments, which illustrate solutions and advantages described below.

It is an object of the present teachings to remedy the above drawbacks and shortcomings associated with prior art utility robots.

It is an object of the present teachings to provide a utility robot that is able to maintain a specified distance away from a vertical or sloped surface of a structure.

It is another object of the present teachings to provide a utility robot that is able to maintain a level (substantially parallel) orientation relative to the vertical or sloped surface.

These and other objects of the present teachings are achieved by providing a robotic device and utility system for working on a surface of a structure (e.g., building, vehicle). The robotic device comprises a body including a tool for working on the surface and a controller moving the body along the surface. A first set of at least two rotors are mounted to the body and generate thrust in a first direction towards the surface. A second set of at least two rotors are mounted to the body and generating thrust in a second direction away from the surface. The robotic device further comprises a sensor measuring a distance between the body and the surface, and a computer adjusting the first set of rotors and the second set of rotors in response to the sensor to place said body in position to work on the surface.

The present teachings also provide a robotic device for working on a surface, comprising a body including a jet configured to emit a gas for working on the surface, and a controller moving the body along the surface. A first set of at least two rotors are mounted to the body and generate thrust in a first direction towards the surface. A second set of at least two rotors are mounted to the body and generating thrust in a second direction away from the surface. The robotic device further includes a computer adjusting the first set of rotors and the second set of rotors to place the body in position for the jet to work on the surface. In some embodiments, the jet comprises an air knife. The computer is designed to adjust the first set of rotors to generate thrust opposing a work force produced by the jet emitting the gas.

The present teachings also provide a robotic device for working on a surface, comprising a body including a jet configured to emit a liquid for working on the surface, and a controller moving the body along the surface. A first set of at least two rotors are mounted to the body and generate thrust in a first direction towards the surface. A second set of at least two rotors are mounted to the body and generating thrust in a second direction away from the surface. The robotic device further includes a computer adjusting the first set of rotors and the second set of rotors to place the body in position for the jet to work on the surface. The computer is designed to adjust the first set of rotors to generate thrust opposing a work force produced by the jet emitting the liquid.

In other embodiments, the robotic device comprises a body having at least one controller that guides the body along a path of travel relative to the vertical or sloped surface of the structure. The robotic device also comprises a thruster system mounted to the body, the thruster system having at least two sets of rotors configured to generate propulsion relative to the vertical or sloped surface, a first set of rotors configured to provide thrust to propel the body away from the vertical or sloped surface and a second set of rotors configured to provide opposing thrust to propel the body towards the vertical or sloped surface. The controller communicates with the first and second sets of rotors to provide the respective thrusts simultaneously so that the body hovers within a range of distance away from the vertical or sloped surface while performing said work on the vertical or sloped surface. The robotic device may also include an anchor mounted on the body for tethering the robotic device to a crane which is disposed on the structure above the robotic device. The anchor is configured to transmit raising and lowering movement of a tether to the body for adjusting the altitude of the robotic device.

The present teachings also provide a robotic device comprising a planar body having a controller that guides the body along a path of travel relative to the vertical or sloped surface of the structure. A thruster system is mounted on one side of the body, wherein the thruster system has at least two sets of rotors configured to generate propulsion relative to the vertical or sloped surface. A first set of rotors is configured to provide thrust to propel the body away from the vertical or sloped surface, and a second set of rotors is configured to provide opposing thrust to propel the body towards the vertical or sloped surface. An anchor is also mounted on the body and configured to releasably tether the body to a crane disposed on the structure above the robotic device. The controller transmits signals to the crane for raising and lowering the body and controls the first and second sets of rotors to provide the respective thrusts simultaneously so that the body hovers within a range of distance away from the vertical or sloped surface while the body is raised and lowered.

The present teachings further provide a utility system for performing work on a vertical or sloped surface of a structure. The utility system comprise a robotic device having a body with a controller and thruster system mounted thereto, the controller guiding the robotic device along a path of travel relative to the vertical or sloped surface, the thruster system having at least two sets of rotors configured to generate propulsion relative to the vertical or sloped surface, a first set of rotors configured to provide thrust to propel the body away from the vertical or sloped surface and a second set of rotors configured to provide opposing thrust to propel the body towards the vertical or sloped surface. A tether is connected to an anchor on the body of the robotic device. The utility also comprises a hoisting device being securable to the structure at a position above the robotic device. The hoisting device includes: a platform carrying a counterweight; a jib extending out from the platform and guiding the tether to support the robotic device in suspension; and a motor configured to spool the tether. The controller communicates with the first and second sets of rotors to provide the respective thrusts simultaneously so that the body hovers within a range of distance away from the vertical or sloped surface while the robotic device performs the work on the vertical or sloped surface. The controller communicates with the hoisting device to raise and lower the robotic device while maintaining the body within the range of distance away from the vertical or sloped surface of a structure.

Other features and aspects of the present invention will become apparent from the following detailed description, taken in conjunction with the accompanying drawings, which illustrate by way of example the features in accordance with embodiments of the invention. The summary is not intended to limit the scope of the invention, which is defined solely by the claims attached thereto.

BRIEF DESCRIPTION OF THE DRAWINGS

It should be understood that through the drawings, corresponding reference numerals indicate like or corresponding parts and features.

DETAILED DESCRIPTION

The present teachings are described more fully hereinafter with reference to the accompanying drawings, in which the present embodiments are shown. The following description illustrates the present teachings by way of example, not by way of limitation of the principles of the present teachings.

The present teachings have been described in language more or less specific as to structural features. It is to be understood, however, that the present teachings are not limited to the specific features shown and described, since the devices herein disclosed comprise preferred forms of putting the present teachings into effect.

Figure 1:
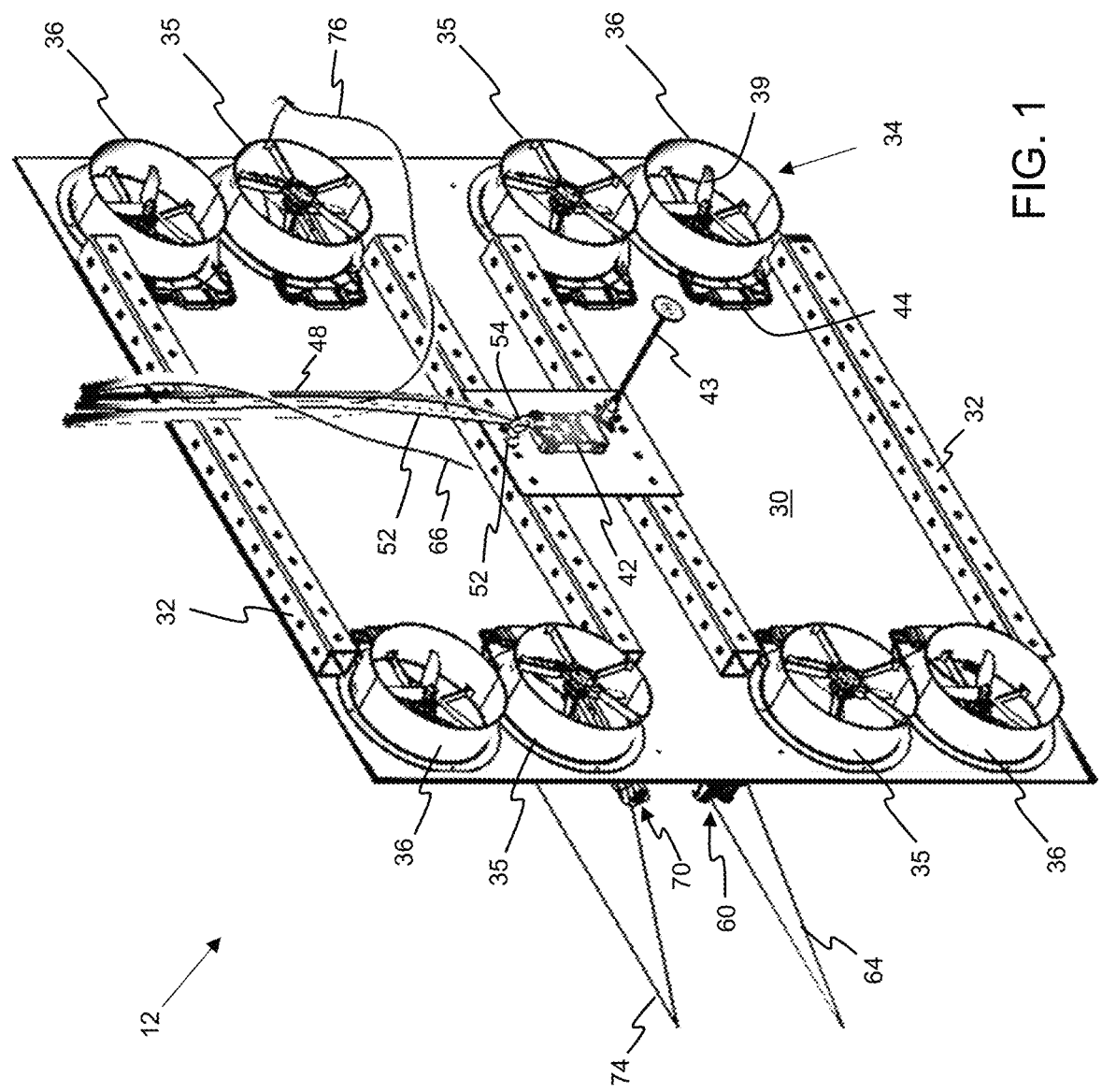
FIG. 1 is a perspective view of a top side of a robotic device according to the present teachings. The top side of the robotic device is configured to face away from a vertical or sloped surface of a structure.

Referring to FIG. 1, a robotic device 12 according to the present teachings is shown. The robotic device is designed to perform work on a vertical or sloped exterior surface of a structure, such as but not limited to the facade of a building (e.g., house, high-rise, bridge), the hull of a vessel, the sides of a vehicle (e.g., tractor trailer), and billboards. For example, the robotic device 12 can inspect the exterior surfaces of a building to detect any structural weaknesses, paint the exterior surfaces, or clean the windows of the building. It is envisioned that the robotic device 12 may be designed to perform other types of maintenance operations depending upon the particular purpose.

Figure 3:
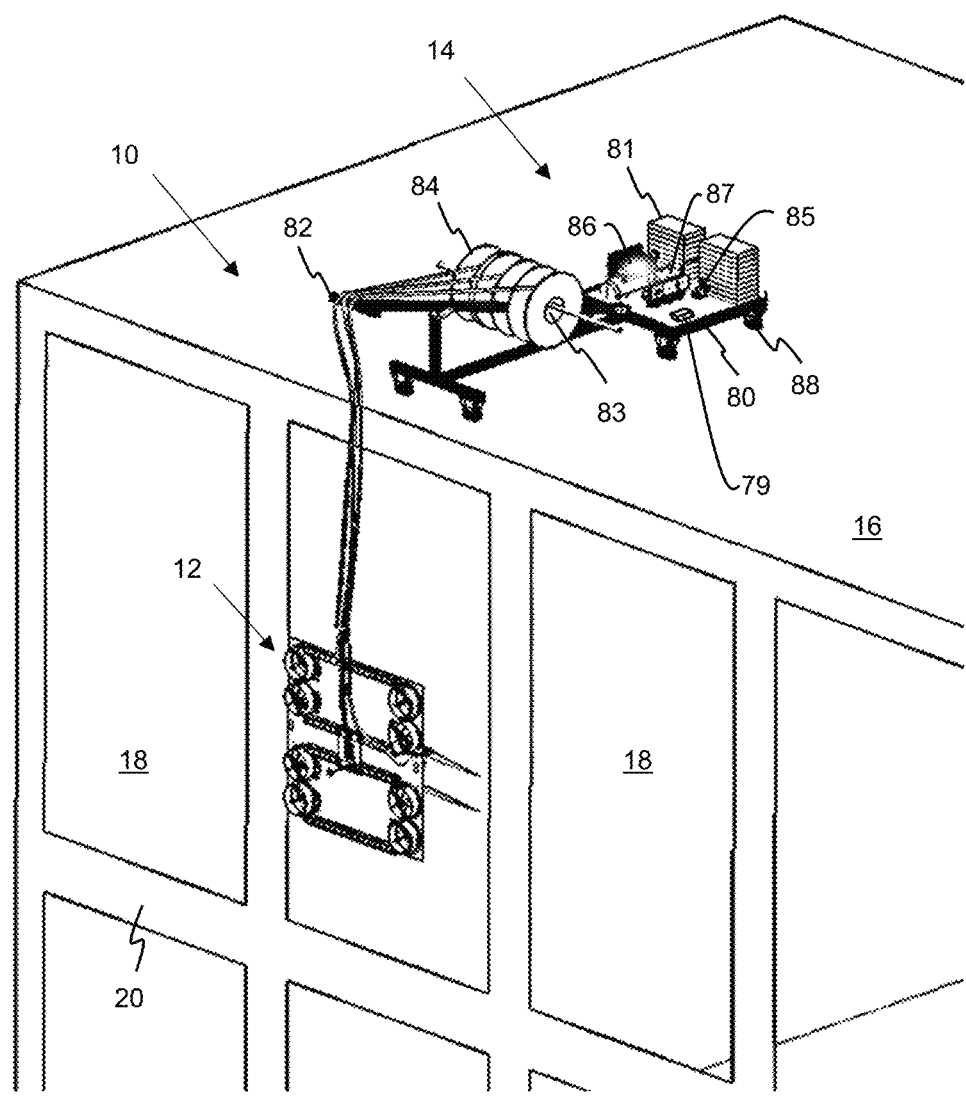
FIG. 3 is a perspective view of a utility system comprising the robotic device of FIG. 1 and a hoisting device secured to the structure.
Figure 4:
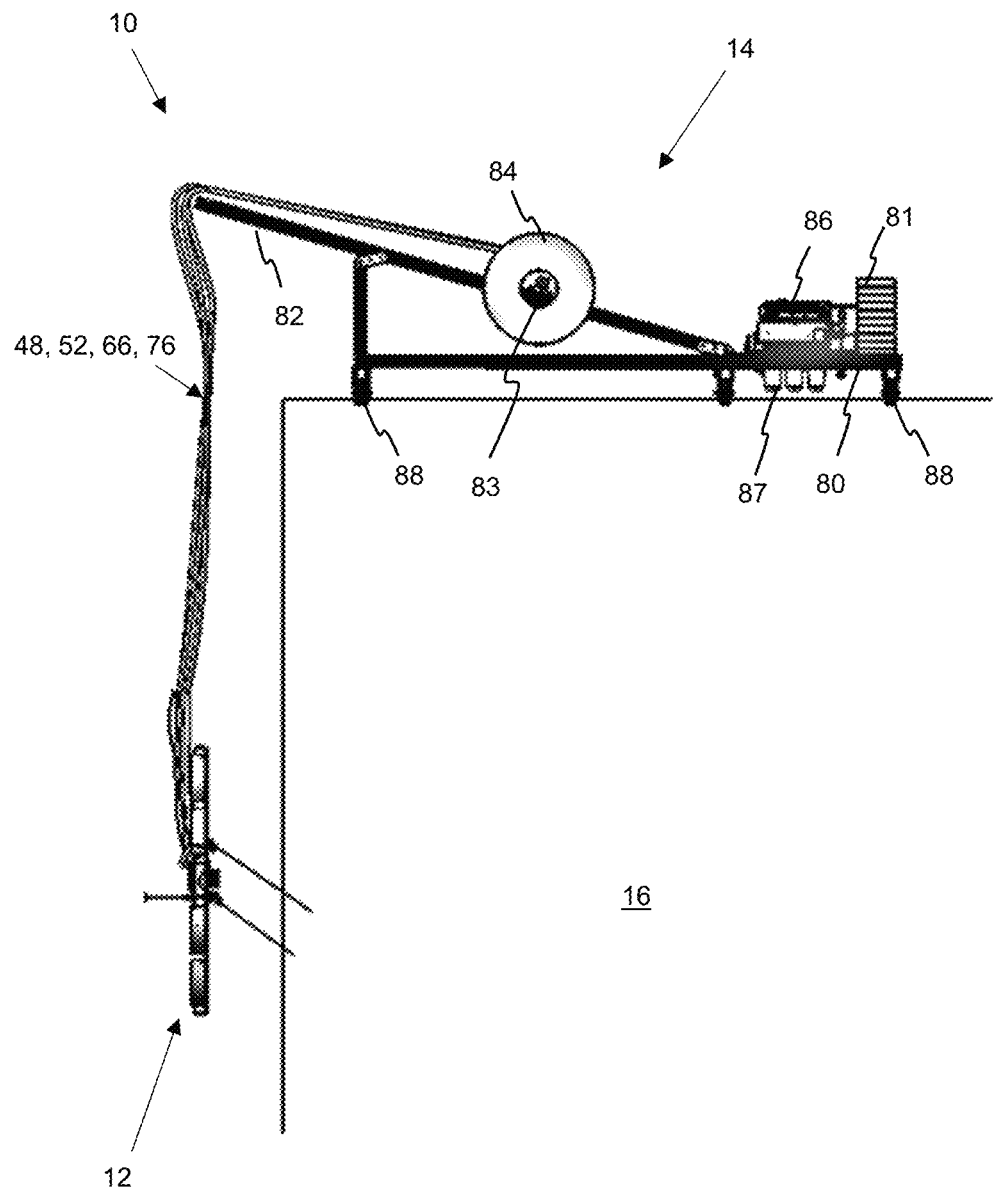
FIG. 4 is a side view of the utility system of FIG. 3.

The robotic device 12 may be combined with a hoisting device 14 to provide a utility system 10 for working on a vertical or sloped surface 18 of a structure 16 as shown in FIGS. 3-4. Both the robotic device and the hoisting device may each comprise a controller (thrust controller 42, controller 79), which will be discussed below in further detail. The exemplary work described herein involves the robotic device 12 having one or more tools for washing windows 18 of a multi-story building 16. It is noted that the present teachings can also be used on a single-story building and a skyscraper. The hoisting device 14 is a crane-like device resembling a crane or davit, which is designed to raise/lower the robotic device 12 in a vertical direction while the robotic device 12 washes a column of windows. The hoisting device may also be designed to move the robotic device 12 laterally side-to-side along the surface 18 of the building. The hoisting device 14 is located above the robotic device 12 and secured on the building 18, such as the roof.

The robotic device 12 will now be described in more detail with reference to FIGS. 1-2. The device 12 includes a main body 30 to which other components of the device are fixed. The main body 30 may be in the form of a flat plate. In some embodiments, the plate may have cut-outs in order to reduce the overall profile of the robotic device 12. This is advantageous in order to minimize any impact that wind may have on the movement and station-keeping of the robotic device. In other embodiments, the main body 30 may comprise a plurality of plates connected to one another by one or more structural braces 32 such that open space is provided between the plates. As shown in FIG. 1, the main body 30—as a single flat plate—includes multiple structural braces 32 that reinforce and increase rigidity of the main body. The structural braces 32 can also provide mounting mechanisms for connecting other components of the robotic device 12. The main body 30 is designed to harness or utilize a cushion of air created between the robotic device and the exterior surface. This air cushion serves as a buffer for the robotic device and helps to reduce the likelihood that the robotic device impacts the exterior surface.

The robotic device 12 includes an anchor 50 mounted to the body 30. In some embodiments, the anchor is formed integral with the body, for example by welding the anchor to the body. In other embodiments, the anchor is attached to the body via a connector on the body itself or is connected to one or more of the structural braces 32. A tether 52 extends between the robotic device 12 and the hoisting device 14, wherein one end of the tether is fastened to the anchor 50 via a fastener 54 and the opposite end of the tether is connected to the hoisting device 14. The anchor 50 accordingly transfers raising and lowering movement provided by the hoisting device 14 to the body 30, thereby adjusting the altitude or elevation of the body relative to ground level. In some embodiments, the fastener 54 releasably connects the tether 52 to the anchor 50.

A thruster system 34 is mounted to the body 30 of the robotic device 12. The thruster system comprises two sets 35, 36 of at least two rotors with propeller blades 39 to generate propulsion relative to the vertical or sloped surface. The rotors operate to position the body 30 in a plane that is substantially parallel to the plane of the vertical or sloped surface. For example, if the windows of the building are vertical (e.g., perpendicular to a horizontal plane), the rotors generate thrust so that the body is also oriented along a vertical plane. This is in contrast with conventional drone technology where rotors are arranged to orient the body relative to the horizon or a horizontal plane of the ground. The first set of rotors 35 are designed to generate thrust in a first direction that propels the body 30 away from the vertical or sloped surface 18. The second set of rotors 36 are designed to generate a thrust in a second direction that propels the body towards the vertical or sloped surface 18. For example, the first set of rotors and the second set of rotors generate thrust in opposing directions. The rotors 35 and 36 are adjusted by a controller 42 to generate a net force to place and/or hold the body 30 in position to work on the surface 18. This aspect is also different compared to conventional drone technology, which have only one set of rotors that generate upward movement and which rely on gravity to provide downward movement. As shown in FIG. 1, the first set may include four rotors 35, and the second set may also include four rotors 36. However, the present teachings require that each set comprise at least two rotors. It is also understood that the robotic device may be configured so that the first set may have a different number of rotors compared to the second set.

Figure 9:
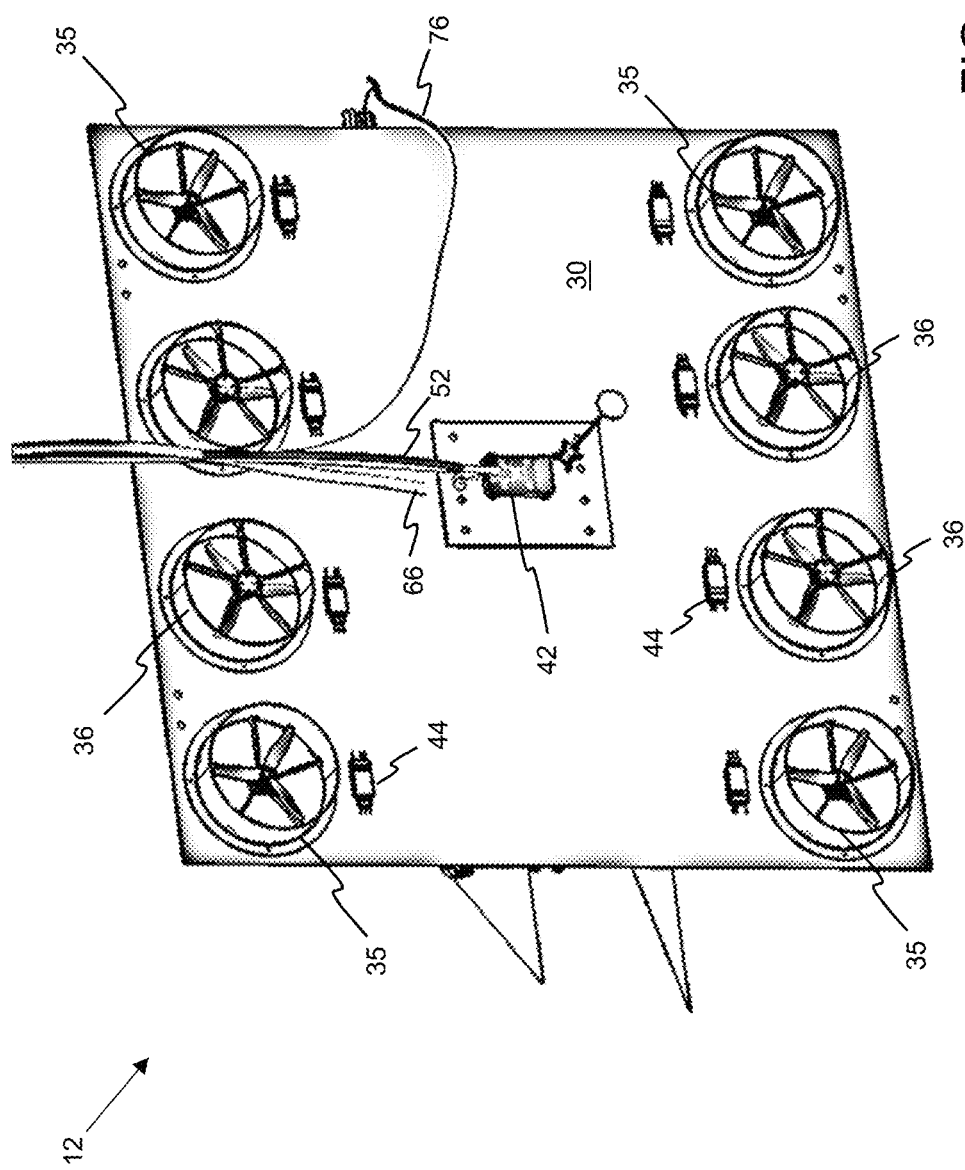
FIG. 9 is a perspective view of another embodiment of the robotic device of FIG. 1 with a different rotor configuration.
Figure 10:
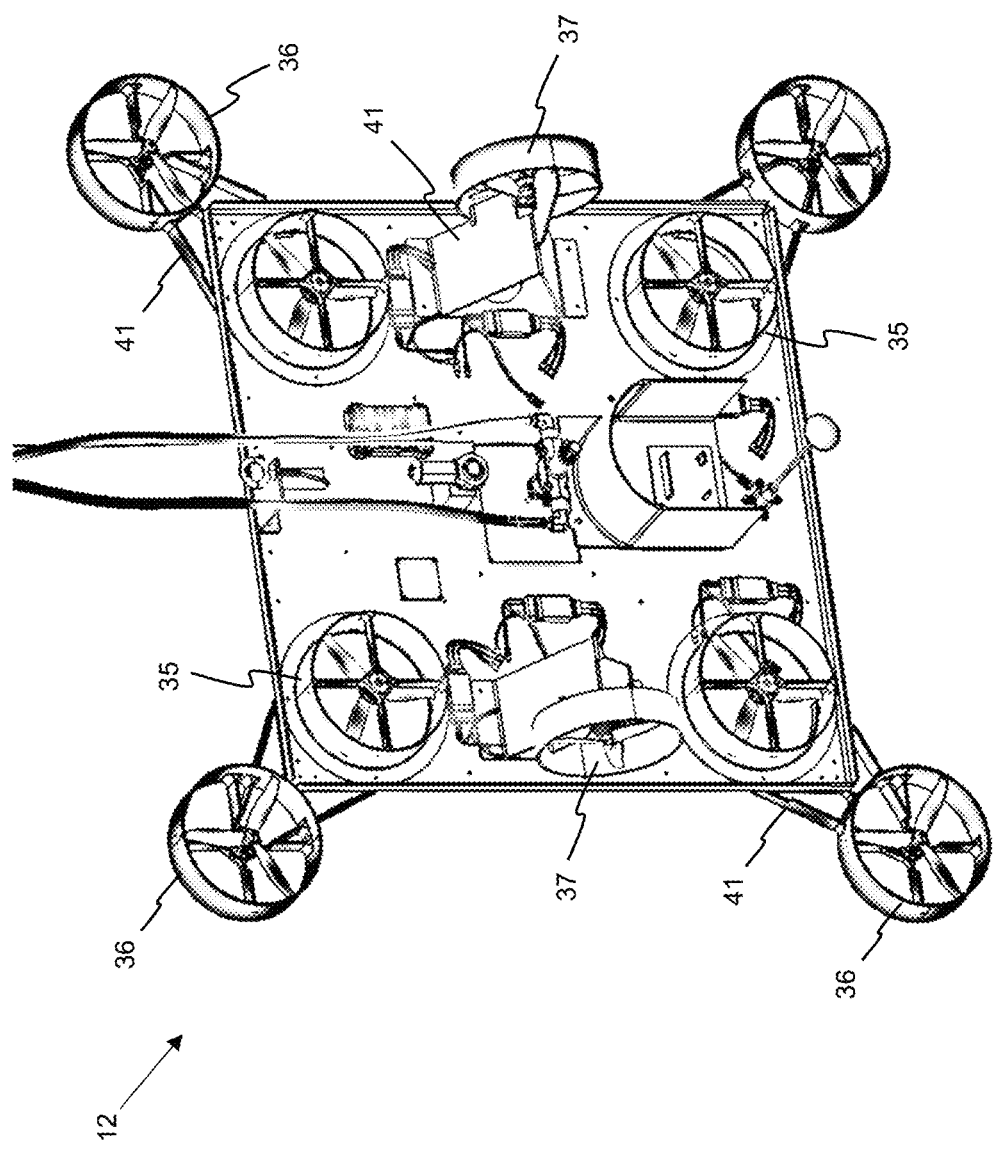
FIG. 10 is a perspective view of another embodiment of the robotic device of FIG. 1 with a different rotor configuration.

The rotors 35 and 36 may be arranged on the body 30 in any number of configurations. FIG. 1 shows the rotors being positioned along the vertical edges (left and right) of the body. More specifically, each set of rotors is arranged in pairs. The axes of the rotors 35 of each pair are spaced equally from a central axis of the body 30 and lie in a plane which contains the central axis. Similarly, the axes of the rotors 36 of each pair are spaced equally from the central axis. FIG. 9 shows another configuration where the rotors are positioned along the horizontal edges (top and bottom) of the body 30. In another embodiment, the robotic device 12 may be designed so that the rotors 35 are mounted directly to the body 30, while the rotors 36 are attached to arms 41 that extend out from the body 30, or vice versa (FIG. 10).

Figure 5:
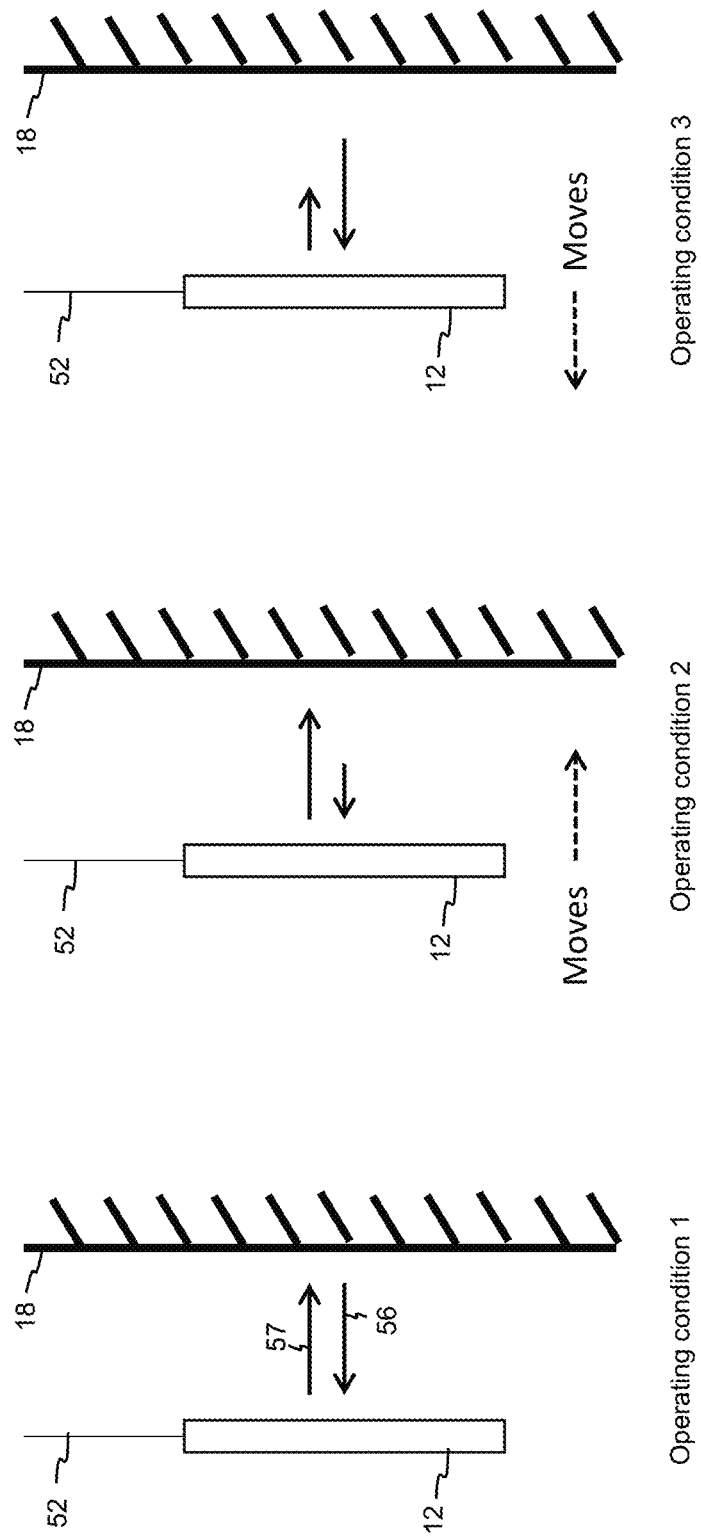
FIG. 5 shows exemplary views of the opposing forces generated by rotors in the robotic device of FIG. 1 relative to the vertical or sloped surface of the structure.
Figure 6:
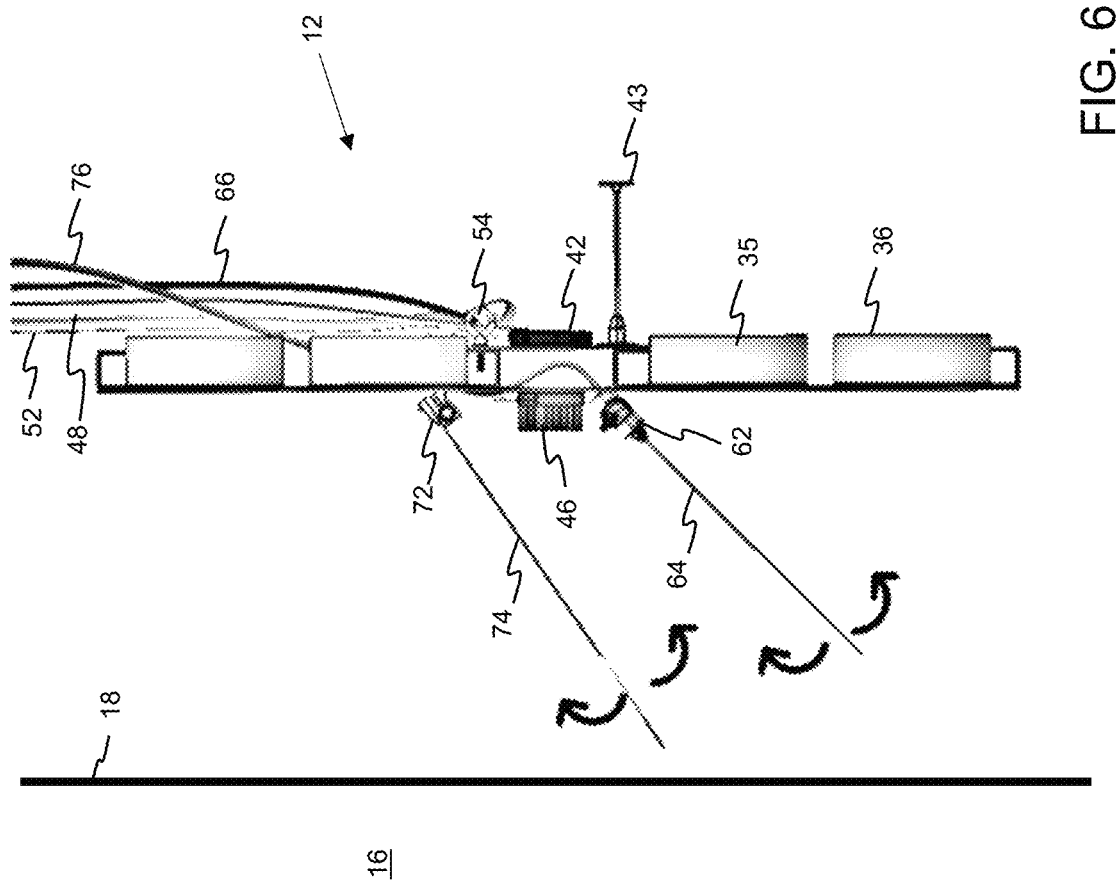
FIG. 6 is a side view of the robotic device of FIG. 1 with exemplary illustrations of directable streams of fluid and gas discharged by the robotic device.

FIG. 5 shows an exemplary operation of the rotors while the body of the robotic device is suspended from above by the tether 52. The thrusts produced by each of the rotors 35 and 36 are controlled to generate a net force to place the body 30 in position to work (e.g., wash, paint, sand blast, etc.) on the surface 18. During a first operational state, when the rotors 35 generate a force 56 that is equal and opposite to the force 57 generated by the rotors 36, the body 30 is held in position by the net force such that work can be performed on the exterior surface 18. For example, the rotors are adjusted by the controller 42 such that the body 30 hovers relative the exterior surface 18 in an orientation substantially parallel to the exterior surface. More specifically, the rotors 35 and 36 generate a net force such that the body is kept apart from the exterior surface in a non-contact position, i.e., where the body does not make contact with the exterior surface, in order to work on the exterior surface. (FIG. 4). In some embodiments, the rotors 35 and 36 can hold the body in position within a range of distance off and away from the vertical or sloped surface 18. For example, the rotors can maintain the body 30 hovering anywhere between 1 and 7 feet away from the exterior surface, or 2-6 feet away from the surface, or 3-5 feet away from the surface. The net force of the rotors 35 and 36 keeps the body within the range of distance to perform work on the exterior surface and/or while the hoisting device raises and lowers the robotic device. During a second operational state, when the force 57 generated by the thrust of the rotors 36 is greater than the force 57 generated by the thrust of the rotors 35, the net force moves the body 30 towards the exterior surface 18 to another position (non-contact) to work on the surface. In some embodiments, the rotors are able to generate a net force which moves the body towards the exterior surface while maintaining it parallel or substantially parallel with the exterior surface. This maneuver is beneficial for working on the surface. For example, the robotic device 12 may be situated 5 feet away from the window to provide a broad spray of water across an entire window and subsequently move forward to a closer non-contact position (e.g., 1 foot away) to provide a more focused (and/or higher pressure) stream of water in order to remove tough grime or heavy buildup of dirt on certain parts of the window. Additionally, when the force 57 generated by the thrust of the rotors 36 is less than the force 56 generated by the thrust of the rotors 35, the robotic device moves further away from the exterior surface 18 to another position for working on the surface. The rotors are able to generate a net force which moves the body away from the exterior surface while maintaining it parallel or substantially parallel with the exterior surface Referring to FIG. 2, the body 30 has a plurality of holes or apertures 40 with which the rotors 35, 36 are aligned. For example, the apertures 40 are formed near the perimeter of the body, i.e., plate. The apertures provide airflow through the body and into/out of the rotors. The robotic device further comprises at least one thrust controller or control system 42 for controlling movement of the body 30 relative to the vertical or sloped surface 18. The controller may be a computer (e.g., Raspberry Pi), processor, microprocessor, multi-core processor, or electronic circuits which receive input data from one or more external sources and performs a function based on the input data. In the context of the present teachings, the controller 42 communicates with at least one position sensor 46 mounted on the side of the body facing the vertical or sloped surface. The sensor, for example, is directed towards the exterior surface to provide remote sensing thereof. The position sensor 46 measures a distance between the body and the exterior surface and transmits the measured distance to the controller as feedback for the controller to adjust the rotational speeds of the rotors 35 and/or rotors 36 to place the body 30 in position to work on the exterior surface. That is, the thrust controller 42 adjusts the first set of rotors 35 and the second set of rotors 36 in response to the sensor data to place the body 30 in position to work on the exterior surface. The thrust controller does not merely use the sensor data for obstacle avoidance, but it responds to the sensor data to actively maintain the body in position for working on the surface. Each rotor has an electronic speed control unit 44 designed to control and regulate the speed of the rotor. The controller 42 generates command signals to the electronic speed control units 44 to adjust the thrust toward the exterior surface and/or the thrust away from the exterior surface so that the body remains in position for working on the exterior surface. In some embodiments, the controller can also receive as inputs a desired distance which the robotic device should be kept apart from the exterior surface and a desired tolerance. If for example the controller receives a desired distance of 4 feet with a tolerance of ±2 feet, the controller will adjust the rotors 35 and/or rotors 36 appropriately so that the body is maintained within the range of 2-6 feet away from the exterior surface. When the position sensor 44 detects that the distance between the body and the exterior surface is decreasing towards the lower limit, the controller will transmit a compensation signal to increase the rotational speed of the rotors 35 relative to the rotational speed of the rotors 36 so that the result of the opposing thrust pushes the body back towards the desired distance. In addition or alternatively, the controller can transmit a compensation signal to decrease the rotational speed of the rotors 36 relative to the rotational speed of the rotors 35 to re-acquire the desired distance between the body and the exterior surface.

The controller may utilize any type of control loop feedback mechanism including, a PI (proportional-integral), PD (proportional-derivative), or PID (proportional-integral-derivative) control algorithm. In other embodiments, the controller may utilize adaptive control algorithms and/or neural networks to adjust control schemes in view of changing external conditions, such as increasing/decreasing wind, change in direction of wind, and/or the presence of mullions 20 of the building 16. The controller provides for autonomous or semi-autonomous control of the movement of the robotic device. The controller may also allow for manual control of the robotic device.

Figure 2:
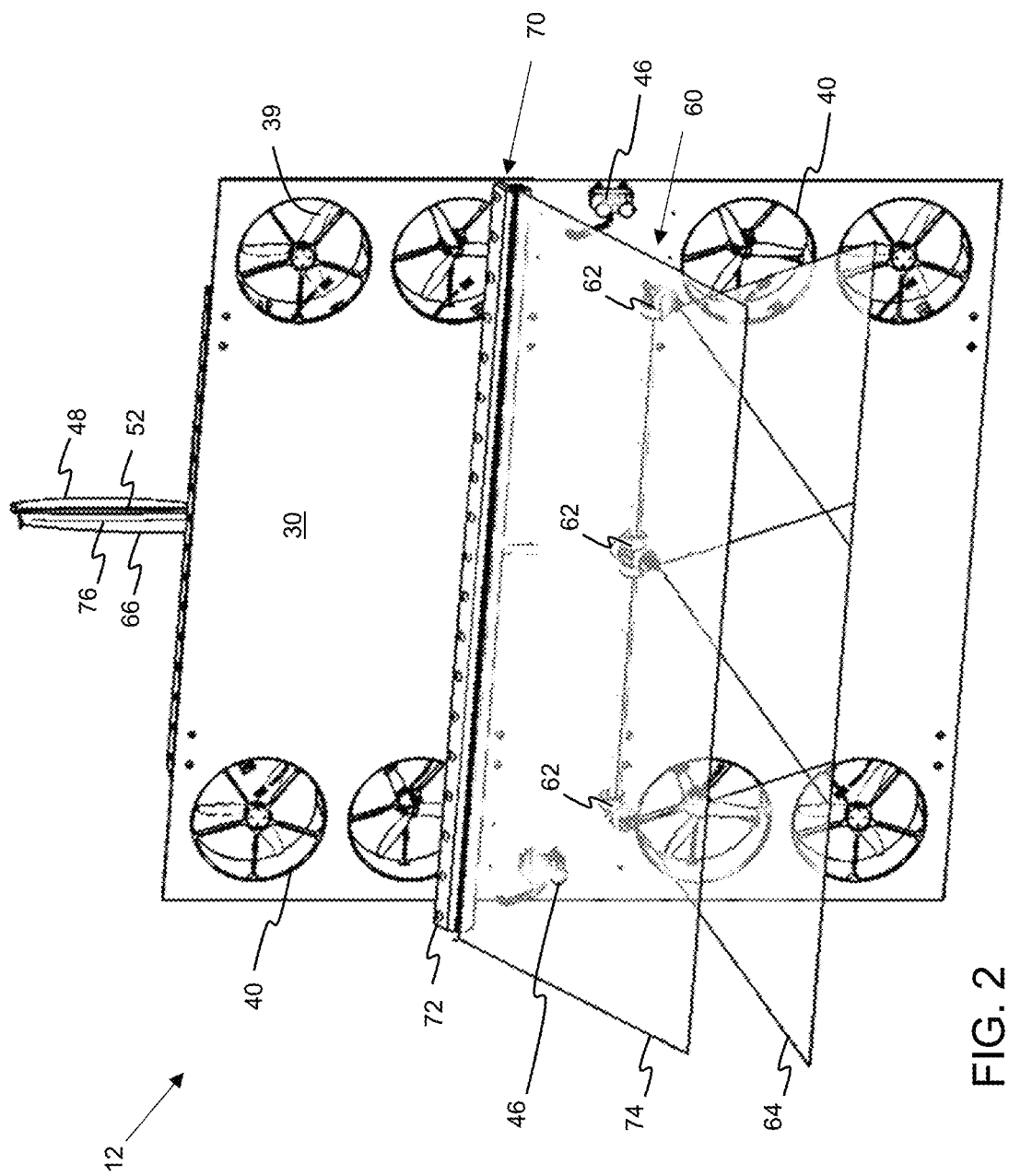
FIG. 2 is a perspective view of a bottom side of the robotic device of FIG. 1. The bottom side of the robotic device is configured to face the vertical or sloped surface.
Figure 7:
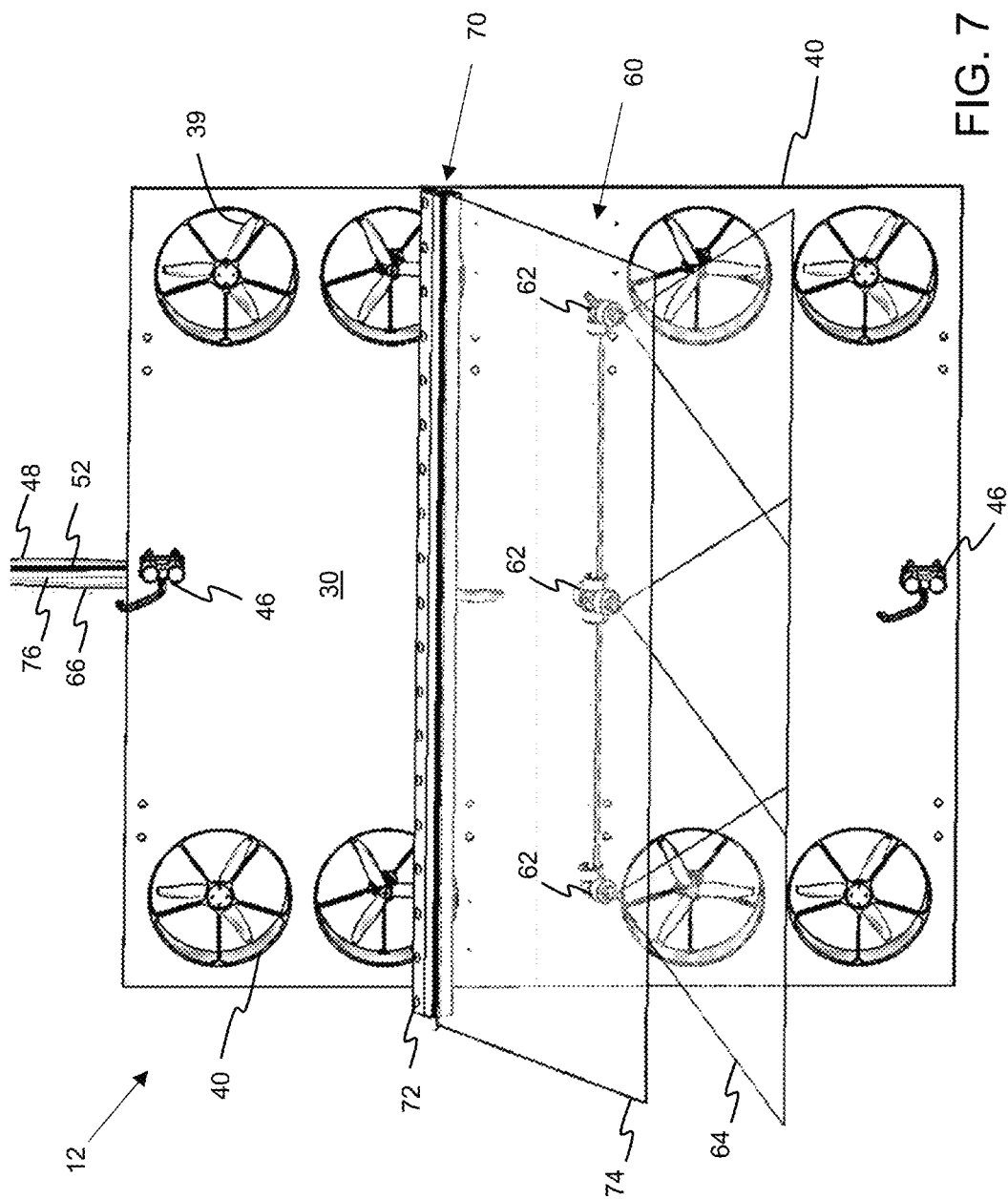
FIG. 7 is a perspective view of the bottom side of the robotic device of FIG. 1 with position sensors in a different arrangement.

In FIG. 2, the robotic device 12 is shown as having at least two position sensors arranged on the left end and right end of the body 30. When there are multiple position sensors, the controller adjusts the thrusts generated by the rotors 35, 36 such that the measured distance from each sensor is within the desired range of distance. This means that both the left side and the right side of the body are maintained within the desired distance away from the exterior surface. In addition, the controller adjusts the thrusts generated by the rotors 35, 36 such that the respective distances measured by the position sensors 46 are substantially same. This helps with keeping the body level in an orientation parallel with the plane of the exterior surface. In some embodiments, the position sensors are arranged at the top end and bottom end of the body 30, as shown in FIG. 7. Still, in other embodiments, there are position sensors disposed at each side of the body or each corner of the body to provide higher precision in station-keeping. One embodiment of the robotic device includes four position sensors arranged in pairs, wherein the sensors of each pair are spaced equally from a central axis of the body (i.e., an axis through a center of the body and perpendicular to the plane of the body) and lie in a plane which contains the central axis and intersects the plane of the other pair at right angles. In some embodiments, the position sensor(s) may be or comprise a proximity sensor, displacement sensor, photodiode array, or any similar sensor for detecting the position of an object and measuring the distance between the sensor and the detected object. Preferably, the position sensor uses optics-based sensing technology and is light or laser-based. For example, the position sensor includes LIDAR (light detection and ranging) transmitter and receiver for remote sensing.

A GPS receiver 43 may be mounted to the body 30 for determining a position of the body. The position data generated by the GPS receiver is transmitted to the controller 42, which uses the data to generate and send a signal to the hoisting device 14 to either lower or raise the robotic device 12. The robotic device 12 may include additional sensors in communication with the controller 42, such as accelerometers for determining the position and orientation of the body while suspended from the hoisting device, tilt sensors and gyroscopes for providing input to the controller in order to maintain level orientation relative to the exterior surface, and/or intake flow sensors to monitor airflow through the rotors. These sensors can provide more data for the controller to appropriately control each rotor independently such that the body remains parallel or substantially parallel to the exterior surface 18 within a range of distance away from the exterior surface 18.

In order to perform work or maintenance on the exterior surface 18 of the structure 16, the robotic device 12 may include one or more tools for working on the exterior surface. For example, the robotic device comprises a liquid delivery system 60 for spraying or ejecting a liquid. The liquid delivery system 60, for example, can spray a cleaning solution or water for washing the windows of a building. The liquid delivery system, on the other hand, can be configured to spray-paint and apply one or more coats of paint, ink, varnish, or the like. As shown in FIG. 2, the liquid delivery system 60 comprises three jets or nozzles 62 each configured to spray a stream of liquid 64 towards the exterior surface 18. The nozzles are arranged along a horizontal axis extending from the left side to the right side of the body 30 to provide an uninterrupted horizontal line of liquid. The horizontal axis of the nozzles is preferably located above half of the rotors 35 and half of the rotors 36. In some instances, the nozzles are equally spaced such that their respective streams of liquid 64 partially overlap. In other configurations, the nozzles are spaced apart such that where one stream of liquid ends, another stream of liquid begins. The present teachings provide for the liquid delivery system to have any number of nozzles 62, such as one, two, three, four, or five. The jets may also comprise actuators that can pivot the jets, thereby adjusting a direction that the stream of liquid is ejected. Such actuators may be adjusted by the controller 42.

The nozzles 62 may be designed to spray the liquid at high pressure for power washing to remove dirt, dust, grime, or the like from the windows. High pressure may be defined as 1000 psi or greater. However, in some embodiments, the nozzles may be designed to spray the liquid at medium or low pressure, such as less than 500 psi, so as to prevent damage to delicate facades. In yet other embodiments, the nozzles may be designed to expel the liquid as a mist. The nozzles can include adjustable valves in order to regulate the pressure of the liquid when it is sprayed. The valves may be controlled by the controller 42 or another control module (e.g., computer, processor, microprocessor, etc.) present on the body 30 of the robotic device 12 to provide dynamic or real-time adjustment of pressure depending on the type of surface currently being washed or worked on. Since the ejection of liquid by the nozzles creates a work force that has the tendency of pushes the body 30 away from the exterior wall 18, the controller 42 accounts for this force (e.g., by way of sensor data from the position sensors 46 and/or pressure sensors) and compensates by adjusting the rotors 35 and/or rotors 36 so that the net force (of the rotor thrusts and the work force) places and/or holds the body in position to work on the surface. To assist this aspect of control, the robotic device may have a pressure sensor(s) at one or more of the nozzles 62. The pressure data obtained by the sensors is transmitted to the controller 42 for generating compensation signals to the speed control units 44 of the rotors 35, 36. The robotic device may also include a sensor that detects the vector of the work force produced by the tool (nozzles), wherein the vector data is used by the controller to adjust the rotors 35 and rotors 36 to place the body in position for working on the surface. The work-force vector detecting sensor may comprise one or more sensors that measure the direction and angle of the stream of liquid ejected by the jet relative to the body 30. As one example, the thrust controller 42 responds to data from the position sensors 46, pressure sensors, and/or work force vector-detecting sensors to adjust the rotors such that a net force on the body places it in position to work on the surface. In one embodiments, such net force places and/or holds the body substantially parallel with the exterior surface 18 and within a specified distance or range of distance apart from the exterior surface 18.

The liquid delivery system 60 also comprises a distribution line 66 fluidly connected to the nozzles 62. FIGS. 3-4 show the distribution line extending above the robotic device 12 to the hoisting device 14 alongside the tether 52. The distribution line 66 conveys the liquid (e.g., water, cleaning solution, paint, etc.) from an external supply located on or originating from the structure. In some embodiments, the distribution line 66 can provide suspension support in addition to that provided by the tether 52.

In addition or alternatively to the liquid delivery system 60, the robotic device 12 includes a gas delivery system 70 for expelling a gas from the body 30 towards the vertical or sloped surface 18. The gas delivery system 70, for example, can spray air to remove excess liquid (e.g., water) and/or dry the windows after being washed. As another example, the gas delivery system 70 may be used to blow away dust and dirt from the exterior surfaces of the structure prior to or without washing. The gas delivery system comprises one or more jets or outlets 72 configured to blow or expel a stream of gas 74 towards the exterior surface 18. In some embodiments, the jet or outlet 72 comprises a gas knife (e.g., air knife) or air squeegee. In other embodiments, the jet or outlet 72 comprises one or more gas nozzles. The outlet(s) is arranged along a horizontal axis extending from the left side to the right side of the body 30 to provide a horizontal line of gas. Preferably, the outlet 72 is positioned above the nozzles 62 (if present), so that as the robotic device is being lowered during window washing operations, a portion of the window is initially washed by the nozzles 62 and then subsequently dried by the outlet(s) 72. Also, the horizontal axis of the outlet is preferably located below half of the rotors 35 and half of the rotors 36. The gas jet(s) 72 may also comprise an actuator(s) that can pivot the jets, thereby adjusting a direction that the stream of gas is ejected. Such actuators may be adjusted by the controller 42.

The outlet(s) 72 may be designed to expel the gas at different pressures, such as high pressure, medium pressure, or low pressure, depending on the type of application required. The outlets may include gas pressure regulators in order to regulate the flow and/or pressure of the gas to a desired output. The regulator may be controlled by the controller 42 or another control module (e.g., computer, processor, microprocessor, etc.) present on the body 30 of the robotic device to provide dynamic or real-time adjustment of pressure depending on the type of surface currently being worked on. Like the liquid jets 62 discussed above, the gas jets or outlets 72 create a work force that has the tendency of pushes the body 30 away from the exterior wall 18. The controller 42, in similar respects, accounts for this work force (e.g., by way of sensor data from the position sensors 46 and/or pressure sensors) and compensates by adjusting the rotors 35 and/or rotors 36 so that the net force (of the rotor thrusts and the work force) places the body in position to work on the surface. To assist this aspect of control, the robotic device may have a pressure sensor(s) at the outlet 72. The pressure data obtained by the sensor is transmitted to the controller 42 for generating the compensation signals to the speed control units 44 of the rotors 35, 36. The robotic device may also include a sensor that detects the vector of the work force produced by the tool (gas jet), wherein the vector data is used by the controller to adjust the rotors 35 and rotors 36 to place the body in position for working on the surface. The work-force vector detecting sensor may comprise one or more sensors that measure the direction and angle of the stream of gas ejected by the jet relative to the body 30.

The gas delivery system 70 also comprises a gas feed line 76 fluidly connected to the outlet 72. FIGS. 3-4 show the gas feed line extending above the robotic device 12 to the hoisting device 14 alongside the tether 52. The gas feed line 76 conveys the gas (e.g., air, compressed air, any combination of gases, inert gas, etc.) from a gas compression unit located on or originating from the structure. In some embodiments, the gas feed line 76 can provide suspension support in addition to that provided by the tether 52 (and distribution line 66).

In some embodiments, the robotic device may include additional tools, such as a brush (e.g., roller brush), wet pads, dry pads (for drying surfaces), etc.

One or more image sensors (e.g., CCD, CMOS, camera, etc.) may also be disposed on the body 30 of the robotic device 12. For example, at least one image sensor is mounted to the side of the body 30 on which the liquid delivery system and/or the gas delivery system are situated. The image sensor may be used to monitor the stream of liquid 64 and/or the stream of gas 74 being delivered to the exterior surface of the structure. In some instances, an image sensor (e.g., CMOS, CCD) may be incorporated to provide optical sensing for determining the distance between the body 30 and the exterior surface, wherein such data may then be utilized by the controller 42. In other instances, an image sensor may be used to perform inspection operations, such as analyzing the condition of facades or detecting structural weakness in the structure. Further, one or more image sensors may be mounted on other sides of the body to provide a field of view around the robotic device, which can also be used by the controller 42 for controlling movement of the robotic device 12. The top side of the body, for example, may include an image sensor which faces up in a direction towards the hoisting device, thereby providing means for monitoring the tether 52, distribution line 66, gas feed line 76, and an electrical cable 48.

Figure 11:
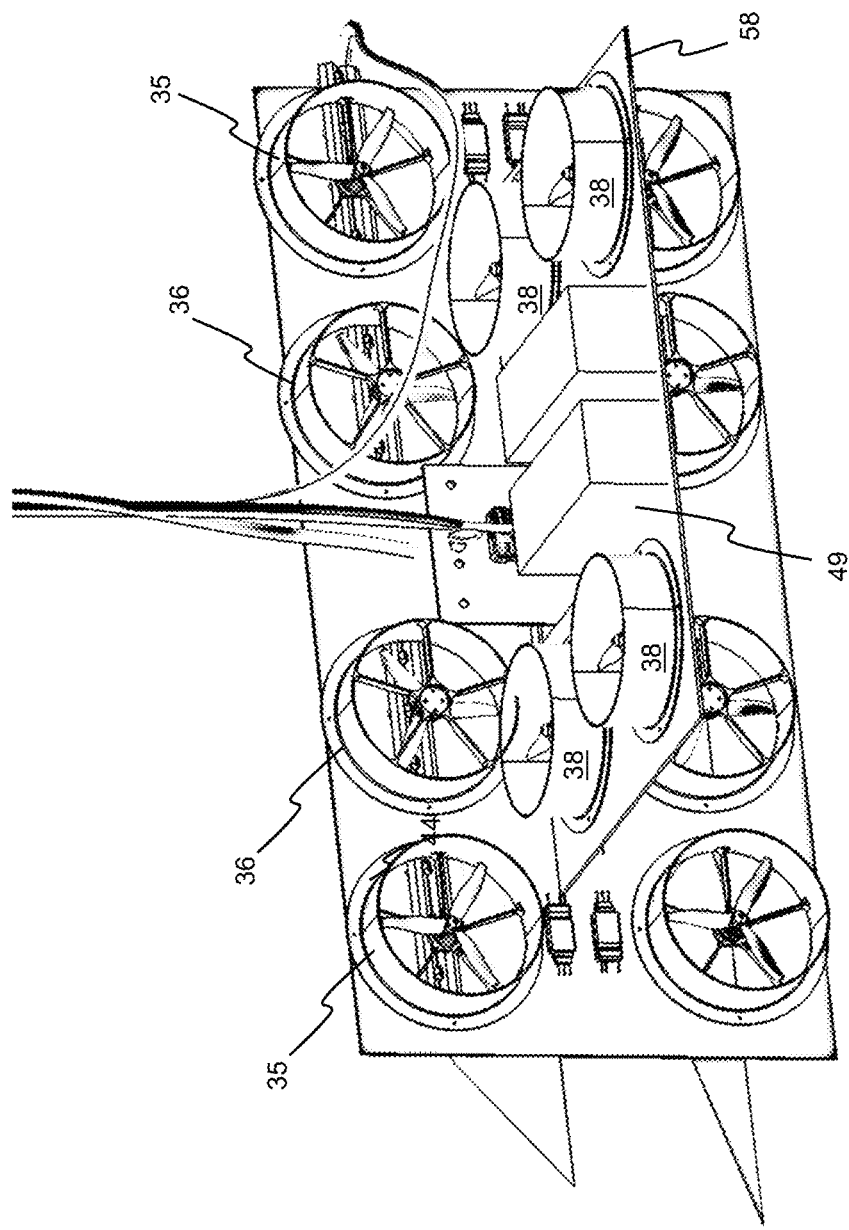
FIG. 11 is a perspective view of another embodiment of the robotic device of FIG. 1 with additional rotors providing altitude adjustment.

In order to power the robotic device 12 and all its various components, an electrical cable 48 may be used to provide external power. As shown in FIGS. 3-4, the electrical cable 48 extends from the body 30 to the hoisting device 14 alongside the tether 52. The electrical cable is configured to transmit electricity at one or more different voltage and/or current levels from a power source to the robotic device. In some embodiments, the electrical cable 48 provide for data transmission between the robotic device and the hoisting device. In addition or alternatively, the robotic delivery system may include one or more on-board batteries to provide either main power for operating the robotic device or backup power if power through the electrical cable is interrupted. As shown in FIG. 11, on-board batteries 49 may be mounted on the side of the body 30 opposite that of the liquid delivery system and the gas delivery system.

The hoisting device 14 will now be described in detail with reference to FIGS. 3-4. The hoisting device may include a control unit or controller 79 (e.g., computer, processor, microprocessor, multi-core processor, electronic circuits, etc.) for adjusting raising and lowering operations. In particular, the hoisting device 14 is designed to raise or lower the robotic device 12, thereby adjusting its altitude/elevation relative to ground level. The base of the hoisting device 14 comprises a platform 80, which is secured to the structure 16. The platform 80 carries one or more counterweights 81 for purposes of maintaining stability when raising and lowering the robotic device 12. A jib 82 extends out from the platform 80 and guides the tether 52 over the edge of the structure 16 to support the robotic device 12 in suspension. In some embodiments, the jib includes a telescoping mechanism so that it may be adjusted with respect to how far it extends from the platform. This aspect allows for the utility system 10 to adapt to any obstacles on the structure. The jib 82 is also configured to guide the electrical cable 48, distribution line 66, and/or feed line 76. The platform 80 further comprises a motor 83 configured to wind and unwind the tether 52 around a spool 84 for raising and lowering operations. The motor 83 may also be configured to wind or unwind the electrical cable 48, distribution line 66, and/or gas feed line 76 around their respective spools 84. As such, the motor 83 will lengthen or shorten the tether 52, electrical cable 48, distribution line 66, and gas feed line 76 simultaneously. Alternatively, the hoisting device may comprise additional motors 83, one for each of the cables and lines. With this configuration, the tether 52, electrical cable 48, distribution line 66, and gas feed line 76 can be independently controlled (raised/lowered) and adjusted. Moreover, with separate motors, different rotation rates and torques can be applied when spooling the tether, cable, and lines.

The hoisting device 14 may also comprise a pump 85 and a filtration unit 86 mounted on the platform 80. The pump 85 conveys a liquid from an external supply through the distribution line 66 to the nozzles 62 on the robotic device 12. For example, water may be pumped from a re-fillable tank present on the platform 80. Alternatively, water may be pumped directly from the structure's water lines or water supply. The filtration unit 86 processes the liquid received from the external supply before being pumped through the distribution line 66. The liquid is filtered to remove impurities or other unwanted substances. In addition, the filtration unit 86 may be adapted to mix the liquid (e.g., paint) prior to being pumped down to the robotic device 12.

A compressor 87 (e.g., air compressor) may be included with the hoisting device 12. Connected to the gas feed line 76, the compressor 87 increases the pressure of a gas to a specified amount and holds the compressed gas in a local storage tank before transmitting the gas to the outlet(s) 72. In the situation where air is used, the compressor sucks in air from the surrounding environment. Alternatively, the gas may be retrieved by the compressor from an external supply.

Each of the components of the hoisting device—motor 83, pump 85, filtration unit 86, compressor 87, and/or jib 82—can be controlled by the controller 79. However, in some embodiments, the hoisting device may not have a controller 79 and instead the thrust controller 42 on the robotic device 12 provides instructions to the various components of the hoisting device 14. For example, the controller 42 may be configured to transmit command signals to the motor 83 through the electrical cable 48, which can provide data transmission. Upon receiving a command signal, the motor can either initiate or terminate raise/lowering operations, adjust the speed in which such operations are performed, and/or adjust the torque. In addition or alternatively, the hoisting device may have the controller 79 mounted to the platform 80. The controller 79 may serve as the primary mechanism for controlling the motor 83 to perform the raising and lowering operations. The controller 79 may be in communication with the thrust controller 42, wherein upon receiving command signals from the thrust controller 42, the controller 79 will interpret the instructions and adjust operating condition(s) of one or more components in the hoisting device 14. The controller 79 may also be configured to provide a reply signal confirming acceptance of the instructions as well as status data on each of the components in the hoisting device 14. In other embodiments, the controller 79 may be configured to transmit command or data signals to the thrust controller 42, which in turn interprets the instructions and adjust operating condition(s) of one or more components in the robotic device 12.

As shown in FIGS. 3-4, the housing device may comprise wheels 88 mounted underneath the platform 80. The wheels provide for movement of the hoisting device 14 while on the structure 16. For example, the hoisting device 14 can move side-to-side along the edge of the structure 16 to provide lateral movement of the robotic device 12. The wheels 88 also comprise brakes which releasably lock the wheels. Movement of the hoisting device can be controlled by the thrust controller 42 on the robotic device 12 or by the controller 79 on the hoisting device 14. Although not shown, the wheels 88 may be designed to ride on tracks installed on the structure 16.

Figure 8:
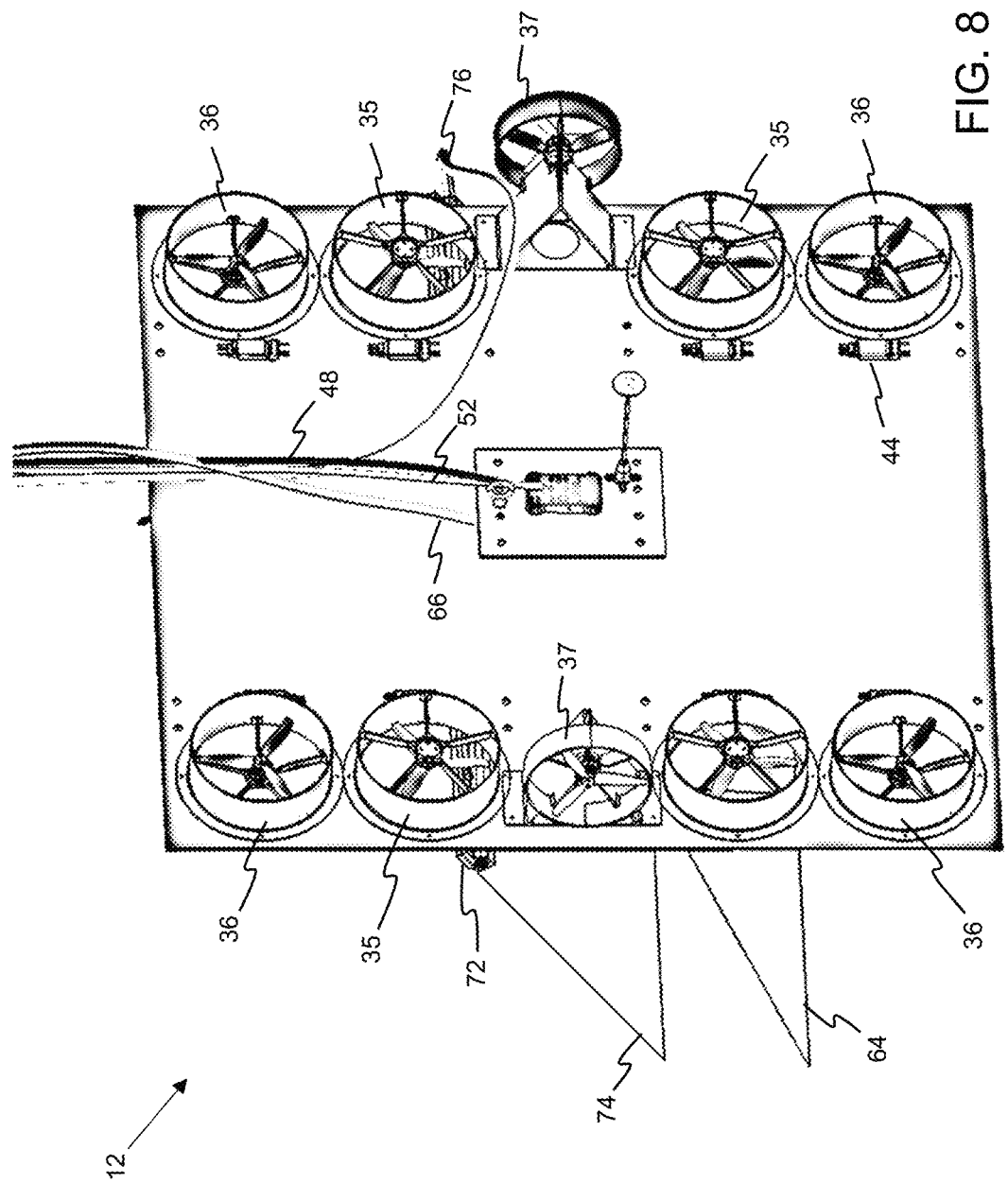
FIG. 8 is a perspective view of another embodiment of the robotic device of FIG. 1 with additional rotors providing lateral movement.

The robotic device 12, in some embodiments, includes another set of rotors 37 attached to the body 30 via extension arms 41, as shown in FIGS. 8 and 10. The rotors 37 provide thrust in directions parallel with the plane of the exterior surface 18, and thus may compensate for cross winds. The rotational axes of the rotors 37 are oriented between 80° and 100° relative to the rotational axes of the rotors 35, 36. Preferably, the rotors 37 are perpendicular relative to the rotors 35, 36. To address the issue of cross-winds or other ambient conditions, the robotic device may comprise one or more sensors, including the proximity sensor 46, an anemometer, and/or wind vane, to measure or calculate the speed and direction of wind. This wind data is provided to the controller 42 so that it can dynamically control the rotors 37 in order to steady the body while being raised and lowered in the presence of wind (ambient conditions) and/or to place the body in position to work on the exterior surface. It is also noted that rotors 37 can be used to actively adjust the lateral position of the body 30 in order to align the robotic device 12 with the window 18.

The robotic device 12, in some embodiments, may also include another set of rotors 38 attached to the body 30 via extension arms 41 or an extension plate 58, as shown in FIG. 11. The rotors 38 are mounted on the same side of the body as the other rotors 35, 36 (and 37). The rotors 38 generate lift for adjusting a vertical position of the body 30. This may be useful in compensating for any downdraft caused by wind that is redirected down the side of the structure 16. In some situations, the rotors 38 may serve as the primary mechanism for raising and lowering the robotic device 12, thereby possibly obviating the need for the anchor 50 and tether 52 or repurposing these components as safety mechanisms. Although not shown, it is understood that the robotic device may comprise all four sets of rotors 35, 36, 37, and 38.

Figure 12:
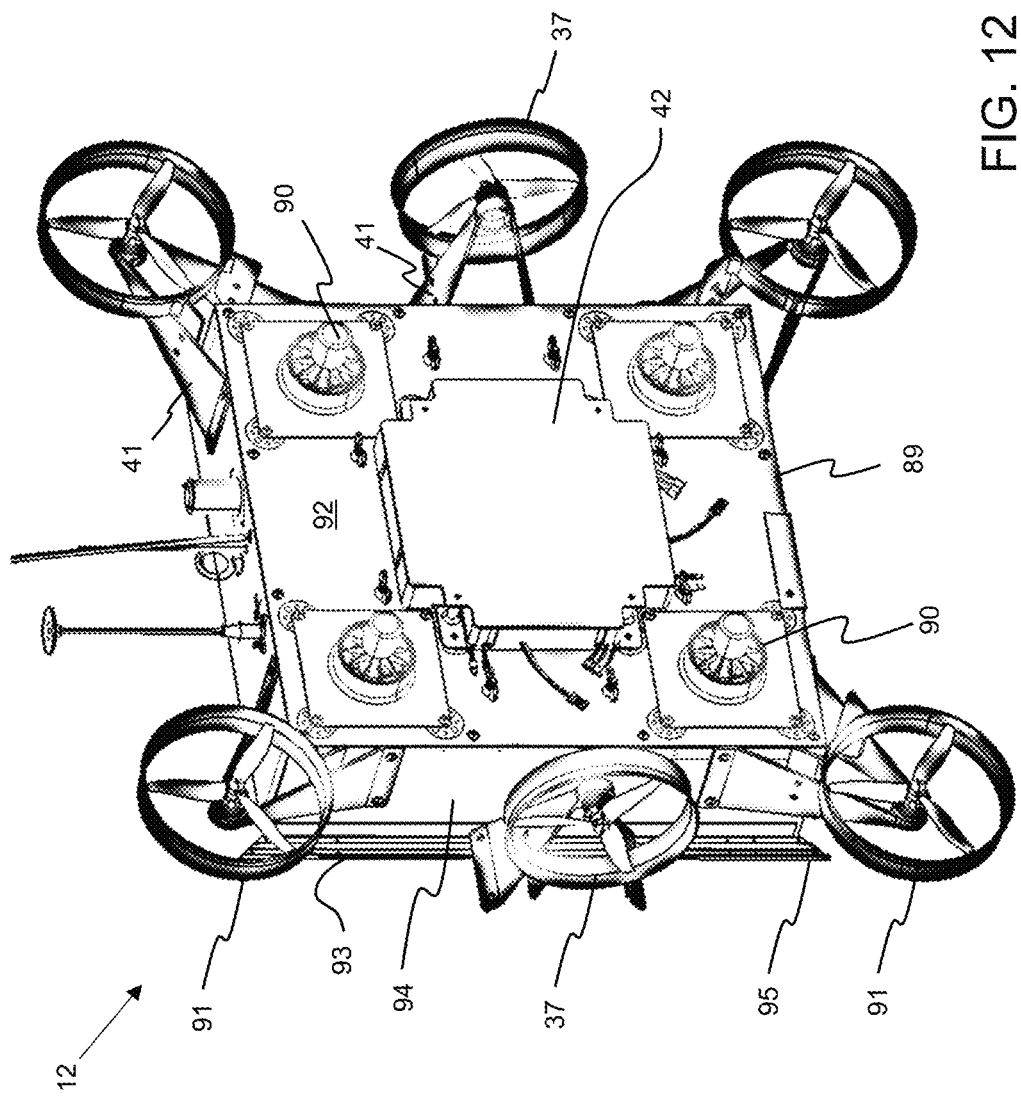
FIG. 12 is a perspective view of another embodiment of the robotic device of FIG. 1, which includes a partial vacuum suction system.

FIG. 12 shows another embodiment of the robotic device 12. Here, the robotic device comprises a partially-enclosed body 89 having at least one controller 42 that guides and controls the robotic device along a path of travel relative to the vertical or sloped surface 18 of the structure 16. The robotic device includes a suction system having at least one fan 90 (e.g., four fans 90) fixed into the body 89. The fan 90 is configured to generate a partial vacuum within the body 89 which produces suction for the body to releasably adhere to the vertical or sloped surface. A thruster system made up of at least two rotors 91 (e.g., four rotors 91) generates thrust relative to the vertical or sloped surface. In particular, the rotors 91 are configured to lift the body off and away from the vertical or sloped surface. The controller 42 is adapted to control the suction system and the thruster system in order to attach and detach the body from the vertical or sloped surface.

The body 89 includes a top surface 92, a bottom surface 93, and side walls 94 attaching the top surface to the bottom surface, wherein the bottom surface includes an opening to an interior of the body. The fan 90 is mounted to the top surface, which has a corresponding orifice to provide air flow to the fan 90. When the bottom surface of the body is positioned on the vertical or sloped surface, the opening is covered by the vertical or sloped surface and the fan 90 produces a pressure differential between inside the body and outside the body by evacuating gases (e.g., air) between the body and the vertical or sloped surface. A motor drives the fan and is controlled by the controller 42.

The robotic device of FIG. 12 may also comprise a driving system mounted at least partially within the body and controlled by the controller 42. The driving system is designed to move the body according to the path of travel while the body adheres to the vertical or sloped surface. The driving system may comprise at least four wheels or tracks divided into two groups. A first group is adapted to drive the body 89 up and down on the vertical or sloped surface, while the second group is adapted to drive the body 89 left and right on the vertical or sloped surface. The driving system includes a motor (e.g., stepper motor) for each wheel or track to provide driving power. The wheels or tracks are recessed within the body in a manner such that they make contact with the vertical or sloped surface without disrupting the partial vacuum generated by the suction system. The driving system may further comprise a suspension unit to absorb bumps and shocks while the wheels or tracks are driven on the vertical or sloped surface.

A liquid delivery system may be incorporated into the body of the robotic device. For example, on the inside of the body, multiple spray nozzles eject a liquid (e.g., water, cleaning solution) while the body is adhered to the vertical or sloped surface. The liquid can be conveyed to the robotic device via a distribution line 66 that extends above the robotic device to an external supply on the structure. A cleaning system may also be incorporated. For example, a plurality of wet pads brush the exterior surface to remove dirt or grime. In some embodiment, the spray nozzles eject the liquid towards the wet pads to maintain dampness. The cleaning system may include rubber wipers 95 mounted on the bottom edges 93 of the body 89. The wipers are used to remove or control excess flow of liquid present on the vertical or sloped surface. The wipers are spring-loaded so that they maintain constant contact with the vertical or sloped surface while the body is adhered to the vertical or sloped surface. More specifically, the rubber wipers are configured to form a seal with the exterior surface for facilitating the generation of the partial vacuum. In some embodiments, the cleaning system includes dry pads for absorbing the liquid on the exterior surface. In order to power the robotic device 12 and all its various components, an electrical cable may be used to provide external power. The electrical cable extends from the body 89 up to a power supply located on the structure. In addition or alternatively, the robotic delivery system may include one or more on-board batteries to provide either main power for operating the robotic device or backup power if power through the electrical cable is interrupted.

It should be understood to a person of ordinary skill in the art that different configurations of the robotic device are possible. For example, the layout of the rotors, speed controllers, position sensors, pumps, and/or discharge nozzles may differ from those shown in the Figures without departing from the scope and spirit of the present teachings. The components included in the robotic device and/or arrangement of components in the utility system may differ from that shown in the Figures without departing from the scope and spirit of the present teachings.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. For example, in some instances, one or more features disclosed in connection with one embodiment can be used alone or in combination with one or more features of one or more other embodiments. It is intended that the scope of the present teachings should be determined by proper interpretation and construction of the appended claims and their legal equivalents, as understood by those of skill in the art relying upon the disclosure in this specification and the attached drawings.

What is claimed is:

1. A robotic device for working on a surface, comprising:
 a body including a tool for working on the surface;
 a controller moving said body along the surface;
 a first set of at least two rotors mounted to said body and generating a first thrust in a first direction towards the surface;
 a second set of at least two rotors mounted to said body and generating a second thrust in a second direction away from the surface and against the first thrust generated by said first set of rotors; and
 a computer configured for controlling said first set of rotors and said second set of rotors for adjusting the first thrust relative to the second thrust to maintain said body in position of equilibrium in the presence of a force exerted on said body, wherein said computer adjusts said first set of rotors to generate thrust opposing said force, wherein said force is a work force produced by said tool.

2. The robotic device of claim 1, wherein the surface is provided as a building.

3. The robotic device of claim 2, wherein said controller is positioned on the building.

4. The robotic device of claim 3, wherein said controller moves said body vertically up and down along the surface.

5. The robotic device of claim 3, wherein said controller moves said body horizontally left and right along the surface.

6. The robotic device of claim 1, further comprising a tether for attaching said body to said controller.

7. The robotic device of claim 1, further comprising a third set of at least two rotors mounted to said body and generating thrust responsive to said force derived from ambient conditions to maintain said body in position of equilibrium.

8. The robotic device of claim 1, further comprising:
a sensor measuring a distance between said body and the surface;
wherein said computer controls said first set of rotors and said second set of rotors in response to said sensor.

9. The robotic device of claim 8, wherein said computer adjusts said first set of rotors and said second set of rotors in response to said sensor to hold said body in a non-contact position to work on the surface.

10. The robotic device of claim 8, wherein said sensor is a light or laser-based sensor.

11. The robotic device of claim 10, wherein said sensor comprises a LIDAR transmitter and receiver.

12. The robotic device of claim 8, wherein the body includes a jet configured to emit a fluid for working on the surface.

13. The robotic device of claim 12, wherein said computer adjusts said first set of rotors to generate thrust opposing said force, wherein said force is a work force produced by said jet emitting the fluid.

14. The robot device of claim 13, further comprising a second sensor, wherein said computer also responds to the second sensor by adjusting said first set of rotors and said second set of rotors to place said body in position for working on the surface.

15. The robotic device of claim 14, wherein the second sensor comprises a pressure sensor measuring a pressure of the fluid emitted and detecting a direction of said jet relative to said body, wherein said computer adjusts said first set of rotors and said second set of rotors in response to the measured pressure and measured direction to generate a net force on said body to place it in a non-contact position for working on the surface.

16. The robotic device of claim 12, wherein said jet includes an actuator configured to pivot said jet for adjusting a direction of the fluid emission.

17. The robotic device of claim 12, wherein the fluid is a liquid.

18. The robotic device of claim 17, further comprising a line feeding the liquid to said jet, the line extending from said body to a liquid supply positioned above said body.

19. A robotic device for working on a surface, comprising:
a body including a tool for working on the surface;
a controller moving said body along the surface;
a first set of at least two rotors mounted to said body and generating a first thrust in a first direction;
a second set of at least two rotors mounted to said body and generating a second thrust in a second direction opposite the first direction and against the first thrust generated by said first set of rotors; and
a computer configured for controlling said first set of rotors and said second set of rotors for adjusting the first thrust relative to the second thrust to maintain station-keeping of said body in the presence of a force exerted on said body, wherein said computer adjusts said first set of rotors to generate thrust opposing said force, wherein said force is a work force produced by said tool.

* * * * *